United States Patent
Waibel et al.

(10) Patent No.: US 6,820,343 B2
(45) Date of Patent: Nov. 23, 2004

(54) DEVICE OF AND METHOD FOR VISUAL FIXATION OF SIGNAL MARKERS ON SURVEYING SURFACES

(75) Inventors: Reinhard Waibel, Berneck (CH); Armin Spiegel, Berneck (CH)

(73) Assignee: Hilti Aktiengesellschaft, Schaan (LI)

( * ) Notice: Subject to any disclaimer, the term of this patent is extended or adjusted under 35 U.S.C. 154(b) by 571 days.

(21) Appl. No.: 09/902,681

(22) Filed: Jul. 11, 2001

(65) Prior Publication Data

US 2002/0005789 A1 Jan. 17, 2002

(30) Foreign Application Priority Data

Jul. 13, 2000 (DE) .......................................... 100 34 035

(51) Int. Cl.[7] .......................... G01C 15/06; B23H 7/04
(52) U.S. Cl. .......................................... 33/293; 33/666
(58) Field of Search .......................... 33/293–297, 367, 33/574, 666, 677, DIG. 21

(56) References Cited

U.S. PATENT DOCUMENTS

| | | | | |
|---|---|---|---|---|
| 4,029,415 A | * | 6/1977 | Johnson | 33/294 |
| 4,382,337 A | * | 5/1983 | Bendick | 33/574 |
| 4,653,910 A | * | 3/1987 | Poling | 33/294 |
| 4,752,156 A | * | 6/1988 | Owens | 404/118 |
| 5,129,154 A | * | 7/1992 | Aydelott | 33/666 |
| 5,367,782 A | * | 11/1994 | Izumitani | 33/367 |
| 5,551,159 A | * | 9/1996 | Mooty | 33/294 |
| 5,621,975 A | * | 4/1997 | Rando | 33/DIG. 21 |
| 5,829,147 A | * | 11/1998 | Kousek et al. | 33/293 |

* cited by examiner

*Primary Examiner*—G. Bradley Bennett
(74) *Attorney, Agent, or Firm*—Sidley Austin Brown & Wood, LLP

(57) ABSTRACT

A marking device for marking visual permanent markers on a surface and including a housing (2), a marking unit (19), a motorized drive (36, 18; 24) for displacing the marking unit relative to the housing (2), a detector device (21) for detecting a measurement signal and for generating a position signal upon deviation of the measurement signal from a marking signal, and a control circuit (27) for controlling the drive (36, 18; 24) and for actuating same in response to the position signal for displacing the marking unit (19) relative to a reference housing position into a corrected marking position.

10 Claims, 5 Drawing Sheets

DEVICE OF AND METHOD FOR VISUAL FIXATION OF SIGNAL MARKERS ON SURVEYING SURFACES

BACKGROUND OF THE INVENTION

1. Field of the Invention

The present invention relates to a marking device for making visual permanent markers on surfaces, in particular on walls and/or ceilings and/or floors of constructional structures in accordance with signal markers preset by a surveying or measuring device, e.g., an optoelectronic measuring device, with the marking device including a marking unit, and a detector device that detects the signals emitted by the measuring device and generates a warning signal that the position of the marking unit should be corrected in case the measurement signal emitted by the measuring device deviates from the signal corresponding to a predetermined position of the marker.

2. Description of the Prior Art

The formation of attachment points in constructional elements, housing structures and the like includes essentially measuring, positioning, and visual marking of the attachment points. Then, receiving bores for receiving the desired fastening elements, e. g., anchors, dowels, and/or screws are formed. Also known is a direct setting method according to which a bolt or a similar fastening element is driven into a constructional component, e.g., a concrete wall, with an explosive power charge-operated setting tool. A substantial portion of time necessary for forming such attachment points is devoted to measurements, positioning, and marking. The time and labor expenditures necessary for performing the above-mentioned operations are very large and often exceed those necessary for actual setting of a fastening element. A particular problem arises when the attachments have to be made at a big height as, in this case, as a rule, auxiliary means, such as ladders, platforms, stands and the like, become necessary in order, e.g., to provide a marker on or beneath a ceiling, a wall and to set in a fastening element. If, e.g., an intermediate ceiling need be suspended, the attachment points over the entire ceiling surface should be measured and marked. To this end, a ladder or a platform should be displaced over the entire space, and often the ladder or the platform should be scaled many times. The same applies to mounting of suspended cable lines, tubular conduits and the like.

There exists, however, a number of surveying or measuring, positioning, and marking devices which permit to substantially reduce, in comparison with conventional methods, the time necessary for measuring and marking of the attachment points. In particular, laser technology-based measuring devices, with which a desired position of a fastening element is projected on a surface with a laser ray, are widely used. The laser ray can be periodically rotated and deflected so that lines can also be projected on a surface spaced from a laser measuring device. However, these devices do not permit to provide a fixed, i.e., a permanent marker at a predetermined point or line as, for security reasons, the laser ray power should be kept small. In such devices, as a rule, the laser ray power should not exceed 1 mW, whereas for a direct formation of a visible permanent marker on a wall or a ceiling, a laser ray power of several 100 W is required.

In order to be able to form permanently visual markers with such laser measuring devices, German Patent Publication DE 196 34 800A1 discloses a marking device that is simple in operation and permits to form visible and fixed markers on walls and ceilings. The structure and the operation of the known marking device can be explained with reference to FIG. 1 which shows a perspective view of the marking device 1 disclosed in DE 196 34 800A1.

The marking device 1 has a housing 2 which is preferably formed of a plastic material and is secured on a, preferably, telescopic lance 3. In the embodiment shown in FIG. 1, the lance 3 is connected by articulation means 5 with a support for the housing 2 displaceable on rollers 4. The rollers 4 provide for displacement of the housing 2 along a surface, e.g., wall W. The marking device 1 includes a detector device located behind an entrance window 6 provided in the front wall of the housing 2 for detecting signals emitted by, e.g., an optoelectronic measuring device equipped with a source of a coherent light. The marking device 1 permits to form permanent markers M along a tracer streak L projected onto the wall W by an optoelectronic measuring device (not shown). A control panel 8, which is provided also on the front wall of the housing 2, is used for controlling the operation of the marking device 1. The marking device 1 also includes a pivotal cover 10 (FIG. 2) which is locked in its locking position with a latch 9. Inside the housing 2, a marking unit 19 is arranged (FIG. 2). The marking unit 19 is connected with a container 14, in which a marking fluid is stored under pressure. The marking unit 19 includes a discharge nozzle 15 with an outlet opening 17 and with which markers M are formed on the wall W.

However, the use of the marking device, in particular, its handling is connected with certain problems. As discussed in DE 196 34 800A1, as soon as the entrance window 6 reaches the region of passing of a marker-forming light signal in form of a laser ray emitted by the laser measuring device, the marking device generates an acoustic signal the repetition frequency and/or tone pitch of which indicate(s) to the operator in which direction the marking device should be displaced in order to reach a correct position to provide for forming the visible permanent markers M at correct points on the wall W at which the fastening elements are to be driven in. Provided that the marker is formed at a position which can be easily reached from the floor, the adjustment of the marking device 1 usually does not present a problem, though it is desirable to reduce subsequent adjustments as much as possible. When the marking device is secured, in accordance with a preferred mode of application, on a lance, visible permanent markers can be formed at large heights, in the ceiling region. However, in this case, a subsequent adjustment is much more difficult. With high requirements to the precision of the position of markers M, a subsequent adjustment of a marking device, which is secured on a lance, if at all possible, is connected with an increased time expenditure. In most cases, the adjustment is effected manually by a person staying on a ladder.

Accordingly an object of the present invention is to provide a marking device of the above describe type in which the precise positioning of the marking unit is effected more rapidly than in the known marking device and, preferably, automatically.

SUMMARY OF THE INVENTION

This and other objects of the present invention, which will become apparent hereinafter, are achieved by providing motor means for displacing the marking unit relative to the housing, detector means for detecting the measurement single and for generating a position signal upon deviation of the measurement signal from the marking signal, and control means for controlling the motor means and for actuating same in response to the position signal for displacing the marking unit relative to its reference housing position into a corrected marker-forming position, determined by the marking signal.

Advantageously, the marking process is initiated automatically as soon as the marking unit reaches a correct marking position.

According to the present invention, the control circuit comprises a computer for calculating, based on an impingement position of the marking signal on the detector means, an offset correction signal determining a necessary displacement of the marking unit. In response to the offset correction signal, the motor means correspondingly displaces the marking unit. For displacing the marking unit with respect to its reference position in the housing, the motor means includes an electric linear drive and/or a pivoting drive.

The novel features of the present invention, which are considered as characteristic for the invention, are set forth in the appended claims. The invention itself, however, both as to is construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENT

Figure 3:
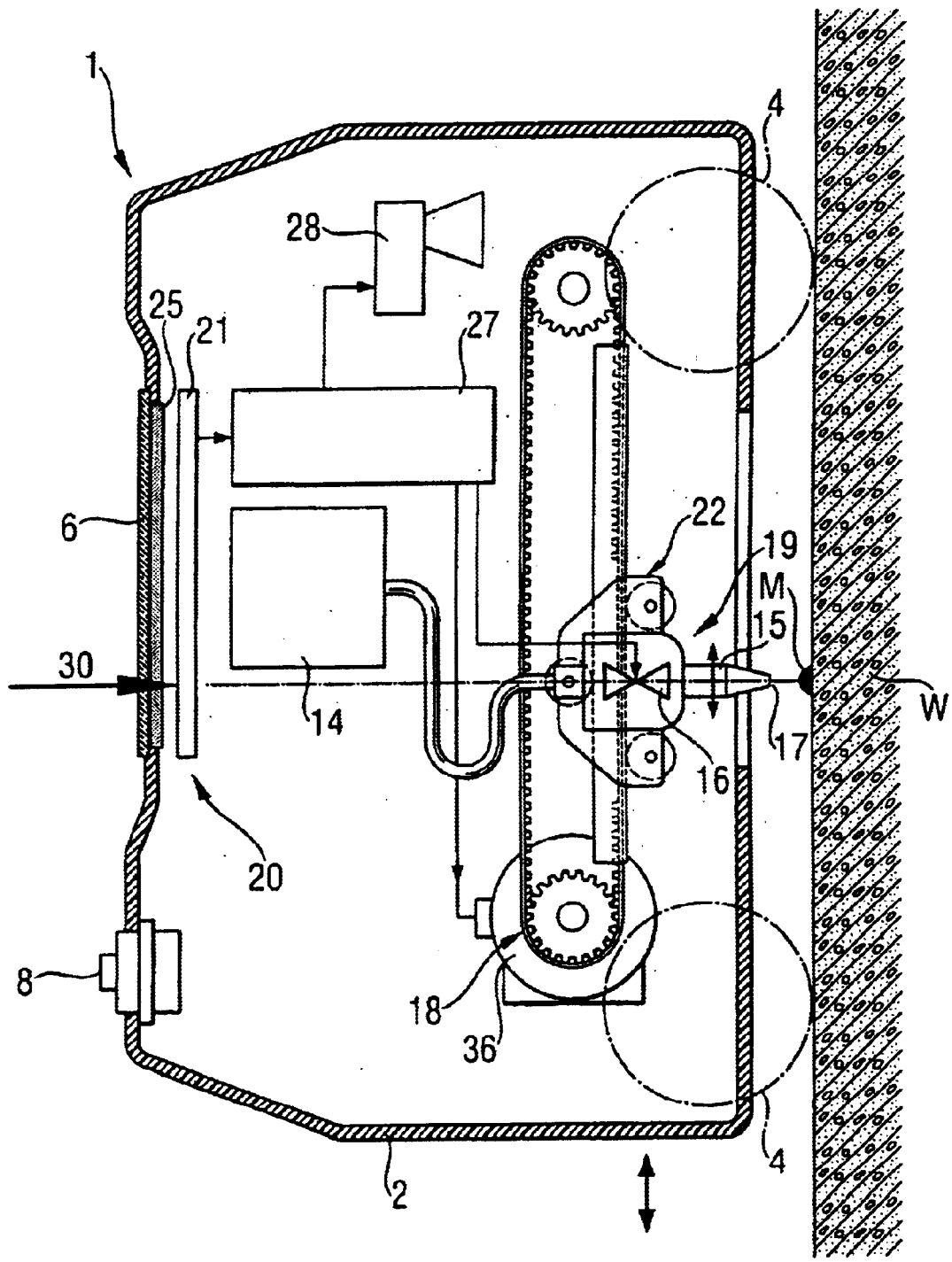
FIG. 3 a cross-sectional view illustrating a principle of a linear displacement of a marking unit according to the present invention.

A marking device 1 according to the present invention, a longitudinal cross-sectional view of which is shown in FIG. 3, is located in a housing 2 and includes, just as a conventional marking device, a detector device 20 and a marking unit 19. In distinction from the conventional marking device, the detector device 20 of the inventive marking device 1 has a flat detector element 21 which will be referred to below as a sensor-array. The detector element 21 can be formed as one- or two-dimensional array of photosensors or, preferably, as a charged-coupled or CCD-element. At at least temporary correct positioning of the CCD-element, a light marking signal ray of an optoelectronic measuring device, which passes through a light entrance window 6, impinges any arbitrary spot on the CCD-element surface. Behind the entrance window 6, there is arranged a replaceable, if necessary, filter 25 permeable only for wave length(s) of a light signal emitted by the light source of the measuring device. The detector element or sensor-array 21 is connected with and electronic circuit 27 formed as a computer-containing microcontroller that determines whether indeed a light single impinged the sensor-array 21. If yes, the electronic circuit 27 communicates a YES-signal to an optical display on a control panel 8 and/or a short excitation signal to an acoustic signal generator 28. Based on the optical and/or acoustic indication, the user determines whether the marking device is located in the region or a light signal emitted a measurement is based on a visual marker. As soon as the light signal, which is emitted by the measuring device, falls on the sensor-array 21 or a predetermined region 31 (FIG. 5), an instantaneous impinged position is detected uni- or two-dimensionally, and the microcontroller calculates a relative position of the marker with respect to the housing 2. The time of the detection of the light signal also defines the reference position of the marking unit 19 in the housing 2.

Figure 4:
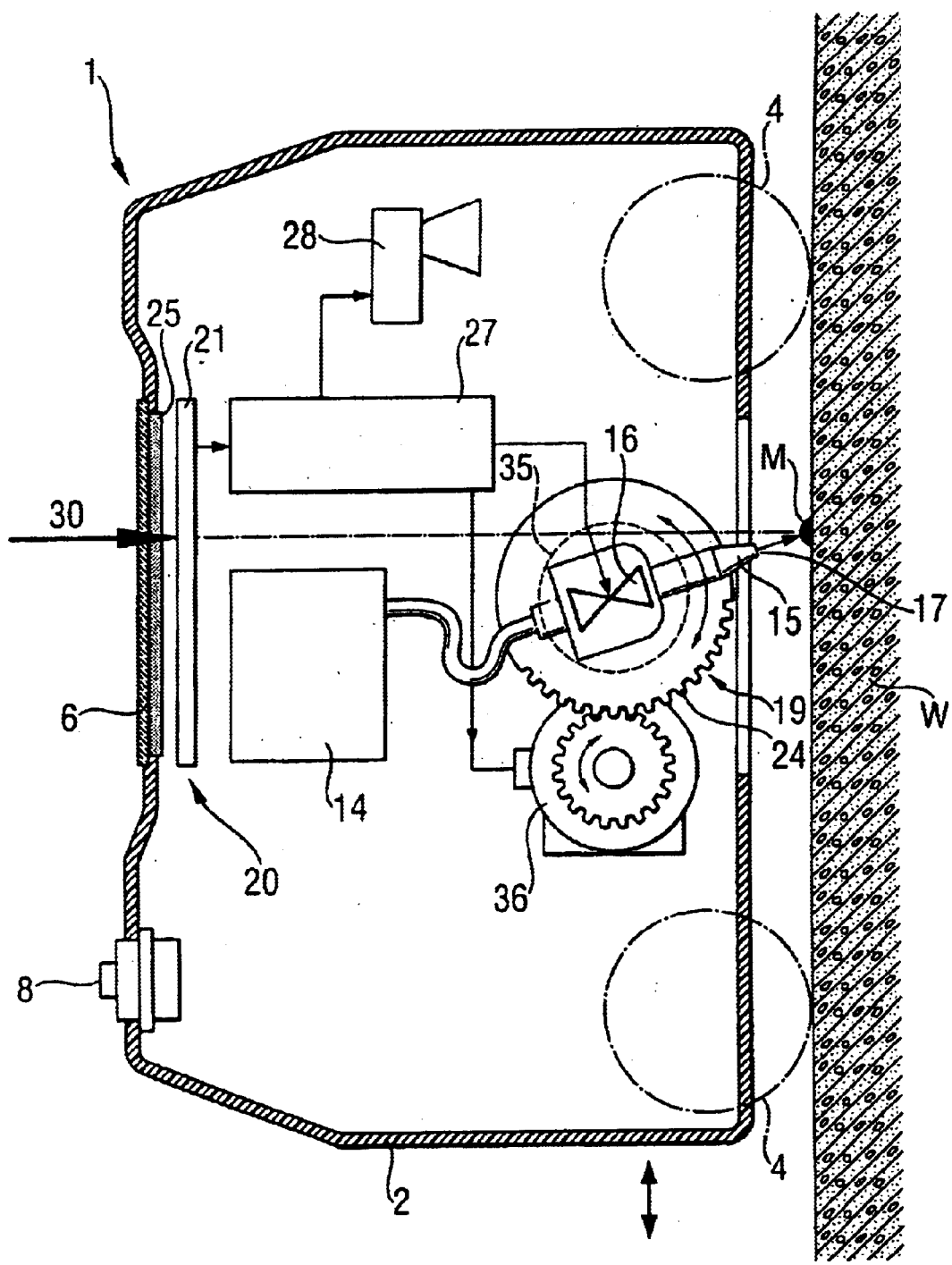
FIG. 4 a cross-sectional view illustrating a principle of a pivotal movement of a marking unit of the marking device shown in FIG. 1.

In distinction from the prior art, according to the present invention, the marking unit 19 is made displaceable relative to the housing 2 in order to provide for a adjustment of the position of the marking unit 19 in accordance with an offset correction signal furnished by the microcontroller, completely or partially, so that a marking fluid-discharging device that can be formed as a discharge nozzle 15 with an outlet opening 17 is brought into a correct marker-forming position. Because of the small mass of the discharge nozzle 15, the position of the discharge nozzle 15 can be marked as soon as the marking measurement signal is detected. The stoppage of the entire device, e.g., by blocking the rollers 4, is not necessary. In the embodiment shown in FIG. 3, either the discharge nozzle 15 can be displaced separately in order to align the outlet opening 17 with the calculated marker position, or the entire injecting device with a container 14, which contains, under pressure, the marker paint or china ink, can be displaced relative to the housing 2 with a slide 22 driven by an electrical linear drive 18. In case when only the discharge nozzle 15 is displaced, it is displaced up and down on the slide 22 driven by the linear drive 18. Additionally, the discharge nozzle 15 includes a shut-off element 16 which is actuated by an electromagnet. The shut-off element 16 is controlled by the electronic circuit 27 and provides for forming of permanent markers upon correct positioning of the discharge opening 7 by opening it for a short time. Upon opening of the discharge or outlet opening 17, a predetermined small volume of the marking fluid, which is contained in the container 14 under pressure, is injected through the opening 17 on the marked surface. Alternatively or additionally, an electrical pivoting device can be provided for the discharge nozzle 15, as shown in FIG. 4. The pivoting device can be driven by a motor 36 and includes a set wheel 24 supported by a pivot bearing 35.

The shut-off element 16 can be formed as a magnet valve which is closed in the non-operative condition of the discharge nozzle 15. As soon as a light signal of the measuring device impinges or falls on the sensor-array 21 and a relative position of the marking unit 19 with respect to the virtual impinge point of the light signal on the to-be-marked surface is calculated by the computer 33 of the microcontroller, the marking unit 19 is displaced relative to the housing 2 of the marking device until the outlet or discharge opening 17 is aligned with a to-be-marked spot M. As soon as the automatic adjusting process is completed, the magnetic valve 16 is excited for a short time, providing for ejection of a small volume of the marker medium.

Figure 1:
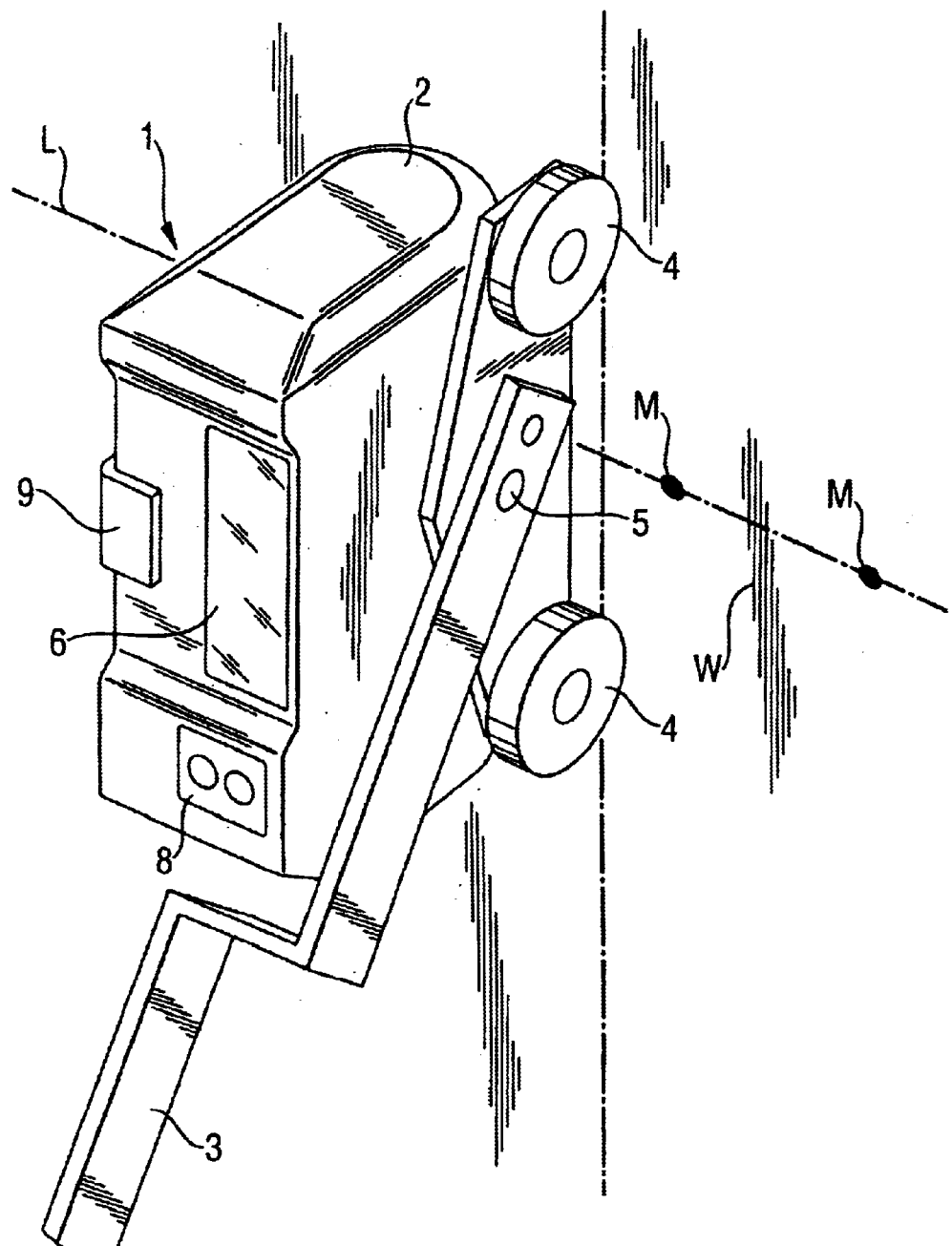
FIG. 1 a perspective view of a conventional marking device.
Figure 2:
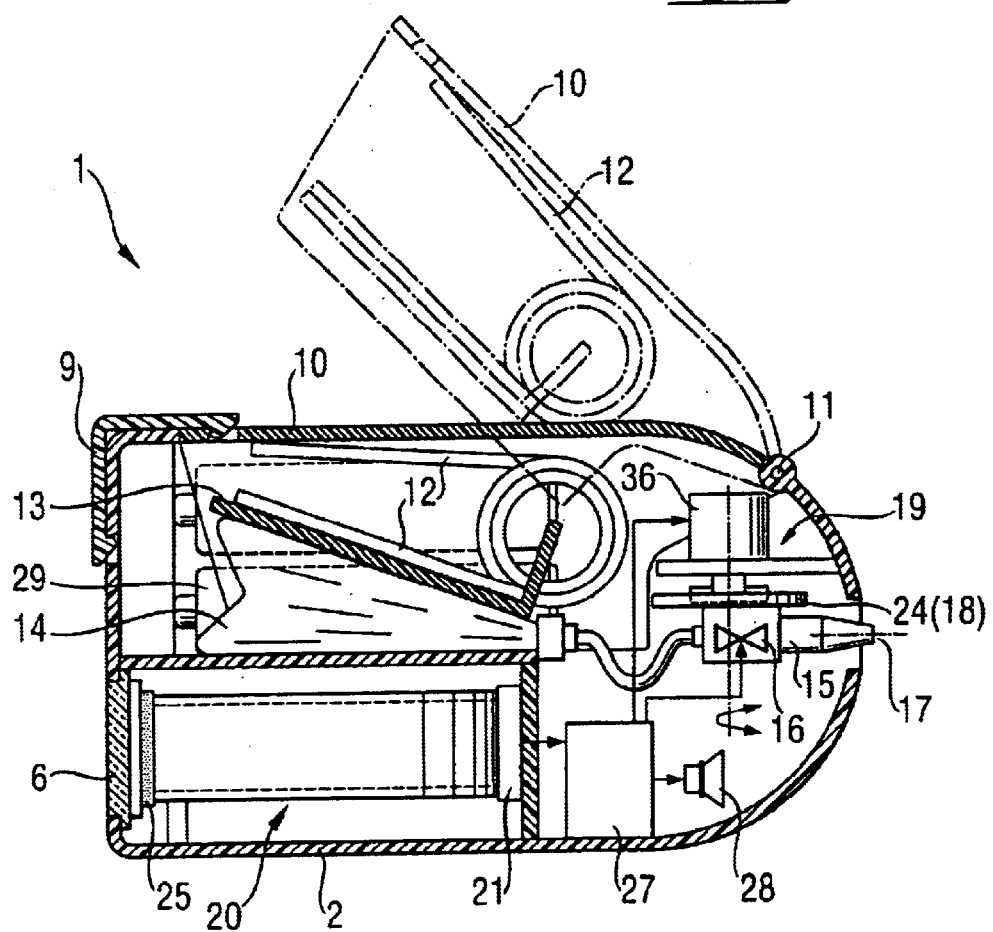
FIG. 2 a cross-sectional view of the marking device shown in FIG. 1.

The market medium is contained in a container 14 which can be formed as a bag. The pressure to the container 14 is applied by a clamp plate 13 which is biased by a spring 13 secured on a pivotal cover 10, as shown in FIG. 2. The cover 10 is secured to the housing 2 with a hinge or articulated joint 11. The cover 10 provides access to the interior of the housing 2, permitting the installation of the container 14 in the housing interior and the replacement of batteries 29. The batteries 29 supply power to the sensor-array 21, the electronic circuit 27, the linear and/or pivoting drive 18/24, and for opening the magnet valve 16. Upon the cover 10 being closed, the spring 12 biases the clamp plate 13 toward the container 14. The cover 10 is locked in its closed position with a latch 9.

In the embodiment shown in the drawings, the marking unit 19 is integrated in the housing 2. However, it can be arranged in a separate housing securable directly on a lance 3. In this case, the detector device with the sensor-array 21 and the offset correction-calculating unit are arranged also in a separate housing which is secured by an appropriate plug-in connection.

The initiation of the marking process can be effected either manually, e.g., as soon as the signal generator 28 acoustically indicates a reception of a light signal indicating the marking location, or automatically, as soon as a light signal falls on the sensor-array 21. After the manual or automatic initiation of the marking process, it runs automatically and very rapidly. To prevent applying of several markers at the same spot or in the region of the marker, there is provided a timing device actuated automatically or by the user.

The marking device according to the present invention permits to form permanent visible markers rather rapidly with only approximate positioning of the marking device in accordance with a marking light signal emitted, in particular, by an optoelectronic measuring device. This is possible because a relative deviation of the marking unit from a predetermined market position is corrected automatically.

Figure 5:
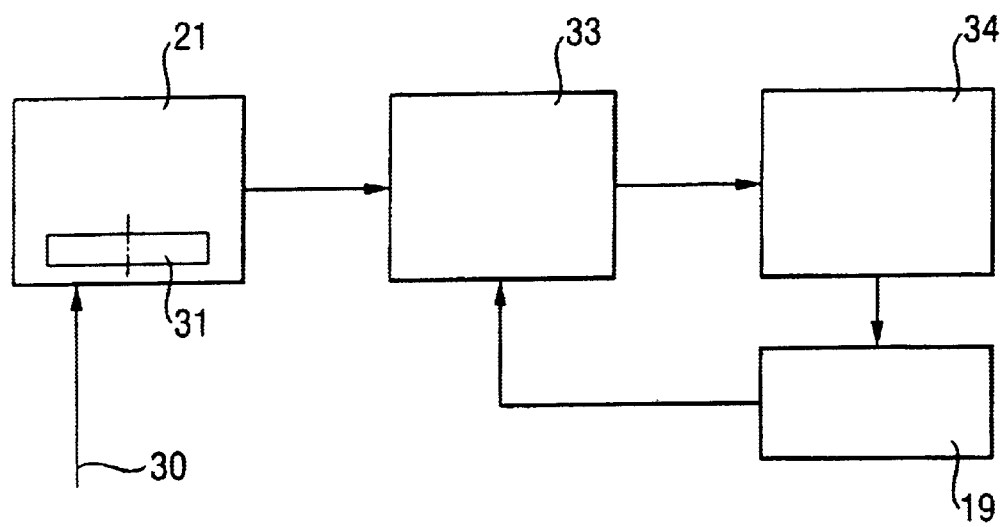
FIG. 5 a block-diagram illustrating an operational principle according to the present invention.

The block-diagram, which is shown in FIG. 5, illustrates the operational principle on which the present invention is based. According to the present invention, a position sensor, in particular, a sensor-array 21, e.g., a CCD-sensor, detects a marking light signal 30, e.g., a laser ray, and in response to detecting the marking signal, generates an acoustic or optical signal that indicates the beginning of a marking process. Simultaneously, the above-discussed reference position of the marking unit 19 in the housing 2 is ascertained. The determination of the reference position of the marking unit 19 in the housing 2 and, thereby, the beginning of the marking process can be limited to a predetermined region 31 of the sensor-array 21, i.e., to the impingement of only signal. A signal, which is generated by the sensor-array 21 and which corresponds to the impingement point of the marking light signal is communicated to the computer 33 forming part of the electronic circuit 27. The computer 33 calculates or determines the relative position of the impingement point of the light signal in the measurement region 31 which serves as a mean value of a limited number of sequential signals generated by the sensor-array 21. The calculated offset value is transmitted to an offset correction control element 34 which controls the correction adjustment of the marking unit 19. The adjustment drive for the marking unit can be equipped with synchronizing or resolver elements so that, additionally, the acknowledgement of the position can be communicated to the computer 33, whereby the precision of the correction is increased.

The present invention, as described above, discusses the use of an opt-electronic, in particular, laser measuring device for obtaining visible and permanent fixation of measurement points. However, the use of other measuring devices used for surveying surfaces and constructional components, e.g., electromagnetic devices, in particular radio measuring devices, ultra-sound devices, and electromagnetic radar-based measuring devices with which, on one hand, the composition of a constructional component, in particular the presence of reinforcing metal is determined, is also within the scope of the present invention.

When a radar-based measuring device is used, the marking device can either marked, with certain tolerance, the inclusion in the constructional component, e.g., of reinforcing metal, on the surface of the constructional component, or the calculation program can be so set from the beginning that the bore marker is made close to the reinforcing metal.

A further improvement of the marking process consists, according to the present invention, in that a correction of the alignment of the marking unit is calculated in advance, after detection of the signal marker, based on the placement of the impingement point of the signal marker on the sensor-array. In this case, several, time-space, marker signals of the measuring device are detected, and with a use of a know algorithm, e.g., such as described in German patent no. 4,344,817, a necessary adjustment angle and/or displacement of the marking unit or the discharge nozzle is determined in advance. By observing the offset value over a predetermined time period, the displacement of the marking unit or of the discharge nozzle is determined and, thereby, the position of the discharge nozzle for the next following offset value is predicted. I.e., the correct position of the discharge nozzle can be substantially more rapidly adjusted.

The present invention permits not only to substantially more rapidly obtain permanent precise markers but also to detect a precise marker position by detection of a ray of a marking light signal.

The present invention permits to obtain a very precise marker even with a weak signal and at different surface reflections.

An automatic alignment of the marking unit permits to conduct the marking process of the type described above even with an elongated lance and with an increased time saving.

Though the present invention was shown and described with references to the preferred embodiments, such are merely illustrative of the present invention and are not to be construed as a limitation thereof, and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. A marking device from marking visual permanent markers on a surface in accordance with emitted by a measuring device, predetermined marking signal that defines a position of a marker on the surface and a measurement signal in response to a measurement, the marking device comprising a housing (2); a marking unit (19); motor means (36, 18; 24) for displacing the marking unit relative to the housing (2); detector means (21) for detecting the measurement signal and for generating a position signal upon deviation of the measurement signal from the marking signal; and control means (27) for controlling the motor means (36, 18; 24) and for actuating same in response to the position signal for displacing the marking unit (19) relative to a reference housing position into a corrected marking position determined by the marking signal.

2. A marking device according to claim 1, wherein the control means (27) comprises computer means (33) for calculating, based on an impingement position of the marking signal on the detector means (21), an offset correction signal determining a necessary displacement of the marking unit (19).

3. A marking device according to claim 1, wherein the motor means comprises at least one of an electrical linear drive (18) and a pivoting drive (24, 36).

4. A marking device according to claim 1, wherein the detector means (21) is formed as a two-dimensional sensor-array.

5. A marking device according to claim 1, wherein the measuring device is an optoelectronic measuring device, and wherein the detector means (21) is formed as optoelectronic detector means for detecting light marking signals emitted by the measuring device.

6. A marking device according to claim 5, wherein the detector means is formed as a CCD-flat sensor.

7. A marking device according to claim 1, wherein the measuring device is formed as a radio signal-emitting device, and wherein the detector means is formed as a radio signal-detecting means.

8. A marking device according to claim 1, wherein the measuring device is formed as a electromagnetic device, and wherein the detector means is formed as a electromagnetic detecting means.

9. A marking device according to claim 1, wherein the measuring device is formed as a ultra-sound-emitting device, and wherein the detector means is formed as an ultra-sound detecting means.

10. A method of making visual permanent markers on a surface in accordance with emitted by a measurement device, predetermined marking signal that defines a position of a marker on the surface and a measurement signal, with the marking device including a housing (2), a marking unit (19), motor means (36, 18; 24) for displacing the marking unit relative to the housing (2), detector means (21) for detecting the measurement signal and for generating a position signal upon deviation of the measurement signal from the marking signal which is emitted likewise by the measuring device; and control means (27) for controlling the motor means (36, 18; 24) and for actuating same in response to the position signal for displacing the marking unit relative to a reference housing position into a corrected marking position, the method comprising the steps of detecting a plurality of chronological, time-space, marking signals emitted by the measuring device; and calculating in advance a necessary displacement of the marking unit in a marking position thereof.

* * * * *